March 5, 1929.  D. W. NEARING  1,704,056

BALL BOUNCING APPARATUS

Filed Nov. 19, 1923

Inventor:
Dudley W. Nearing,
by his Attorney.

Patented Mar. 5, 1929.

1,704,056

UNITED STATES PATENT OFFICE.

DUDLEY W. NEARING, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

BALL-BOUNCING APPARATUS.

Application filed November 19, 1923. Serial No. 675,583.

This invention relates to testing and is herein exemplified as an apparatus for testing and advertising certain qualities of steel balls for ball bearings.

In order to produce a strong, durable ball bearing, operating with a minimum of friction, one essential is that the balls be of uniform size, sphericity, elasticity, hardness, density, etc. It is one of the objects of this invention to provide an improved testing apparatus which will determine when the balls have these uniform characteristics. Another object is to provide a testing apparatus which will eliminate the human element and automatically separate, from a batch, those balls that do not conform to the required characteristics. Still another object is to provide an apparatus which will attract attention and advertise the uniform quality of steel balls for ball bearings and the like. Yet another object is to provide an improved method of testing balls.

To these ends and also to improve generally on devices of this nature, the invention also resides in the various matters hereinafter described and claimed.

Referring to the drawings.

Figures 1, 2, 3, 4, 5, 6:
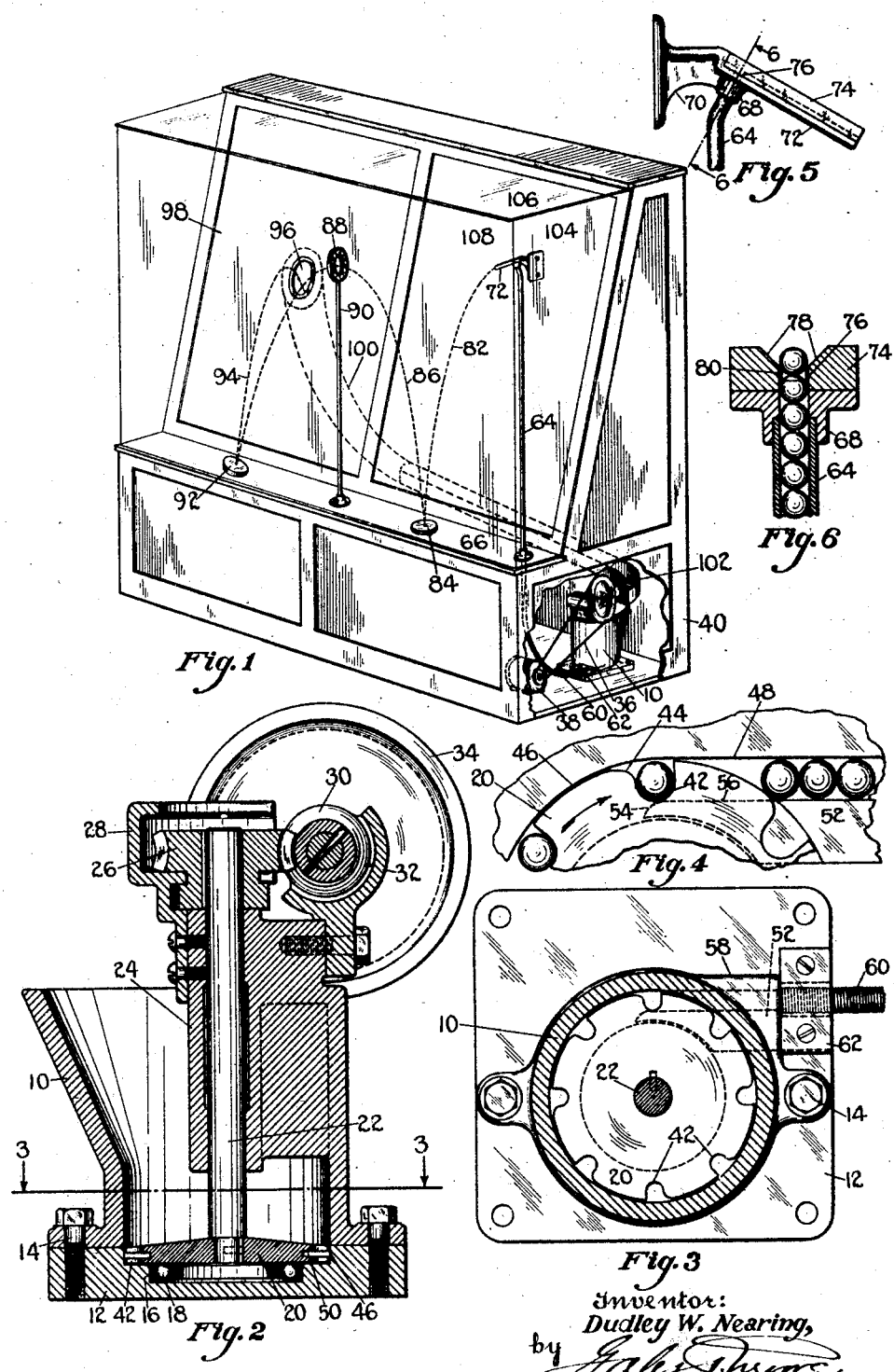
Figure 1 is a perspective view of the apparatus partly cut away to show interior mechanism.
Figure 2 is a vertical section through a portion of the mechanism.
Figure 3 is a section on the line 3—3 of Figure 2.
Figure 4 is a detail view of a part of the ball feeding mechanism.
Figure 5 is a detail view of a portion of the apparatus.
Figure 6 is a section on the line 6—6 of Figure 5.

The numeral 10 indicates the substantially circular wall of a hopper fastened to a base plate 12 by screws 14. In a circular recess 16 in the base plate is a ball thrust bearing 18 supporting a feed disk 20 which is detachably keyed to a vertical shaft 22 journaled in a bearing 24 on the wall of the hopper. The shaft has fixed to it, at the upper end, a worm wheel 26 held to the shaft and inclosed by a housing 28. A worm 30 meshes with the worm wheel and is fixed to a horizontal shaft journaled in a bracket 32 fixed to the hopper, one end of the shaft having a pulley 34 connected by a belt 36 to an electric motor 38 supported on the bottom of a case or box 40 which incloses all of the mechanism.

The disk 20 has a series of notches 42 at its periphery, the inner portions of the recesses conforming to the surfaces of balls and one side of each recess being straight and the other side rounded as at 44 and merging with the periphery of the disk. A vertical circular wall 46 of a recess in the base plate 12 closely surrounds the periphery of the disk and forms a pathway for the balls leading to a tangential passage closed on one side by the straight wall 48 shown in Figure 4. The disk 20 has a peripheral groove 50 deeper than the notches, and a removable blade or separator 52 extends into this groove, its end portion 54 being rounded so as to present no sharp corner to the balls. The blade has a straight edge 56 parallel to the wall 48 and forming the other side of the exit passage from the hopper. The blade is set into a slot of the base plate where it is covered by an enlargement 58 on the hopper wall.

When a batch of steel balls are dumped into the hopper 10, some of the balls find their way into the notches 42 and are carried around by the rotating disk. The straight edge 56 of the blade then causes the balls to ride out of their notches into the tangential passage, the rounded portion 44 of each notch rolling on the ball and the periphery of the disk thereafter preventing the ball from being forced backwardly by the weight of the preceding ones. The feeding of the balls from the hopper is therefore intermittent but the balls are moved a uniform distance, without retrogression, and are eventually forced one by one to the same point in an inclined chute.

The exit passage from the hopper communicates with an expansible and flexible tube 60 made of helically coiled wire, one end of the tube being fastened to the base plate 12 by a cap plate 62 and the other end of the tube leading upwardly and communicating with the lower end of a substantially upright tube, conveniently in the form of a hollow standard 64 fastened to a shelf 66 on the case or box 40. The upper end of the standard is bent at an angle and enters an opening in an enlargement 68 on a bracket 70 fastened to a convenient part of the case to brace the standard. The bracket has an inclined portion 72 carrying a plate 74 having a ball opening 76 in alignment with the hollow standard. The plate 74 also has a chute or trough of a width slightly less than the diameter of the ball opening 76, one of the vertical sides of the trough being indicated at 80. The plate also has inclined faces 78 meeting the vertical sides 80 of the trough and the corners thus produced form a runway down which the balls roll one by one when lifted high enough by the feeding mechanism. The balls are all raised to the same height so that no impetus is given to them other than that imparted by rolling down the chute. If a ball should jam in the standard for any reason, the tube 64 will expand and prevent any breakage.

As the balls roll down the inclined delivery chute they follow the dotted line 82 in Figure 1 and strike against a hardened flat bounce plate 84 which is inclined downwardly slightly, away from the standard. The balls then bound upwardly along the dotted line 86 (if they possess the desired characteristics) and pass through an opening in a ring or hoop 88 detachably fastened to a second standard 90. The ring 88 is here shown as an assembled ball bearing but any suitable ring may be employed. The balls then continue on and drop upon a second bounce plate 92 which is inclined in two directions, towards the standard 90 and towards the rear of the apparatus. If the balls are of the correct quality, so that they strike the proper point on the plate 92, they then bound along the path represented by the dotted line 94 and pass through an opening 96 in an opaque panel 98 inclined slightly to the vertical. Thereafter the balls enter a funnel or chute 100 of felt or other sound-deadening material and this funnel may conduct them either out of the apparatus entirely or into a chute 102, which carries them back again into the hopper. This would be the normal course of the balls when the apparatus is used for advertising purposes, and, in that case, the balls would be previously selected for their uniform characteristics so that they would all run continuously through the machine. This would also be the course of the balls if it were desired to repeat the test a number of times to make sure that all of the balls are of acceptable quality. For instance, although a ball might possess the desired characteristics as to elasticity, it might not be exactly spherical and nevertheless, it might strike on a portion of its surface which is sufficiently like a sphere to cause the ball to traverse the indicated path. By running the balls through the machine a number of times, however, they will strike on different portions of their surfaces and hence will ultimately be eliminated if not up to standard. The test however is a very delicate and sensitive one so that, for most purposes, one traverse through the machine is sufficient in which case the funnel 100 is arranged to lead the balls entirely out of the case and into a bin or the like. Balls that are not up to standard strike either the ring 88 or the panel 98 and collect on the shelf 66.

To render the apparatus more interesting, striking, and mysterious for advertising purposes, all of the working parts are hidden behind opaque panels except the bouncing mechanism, this being visible through the glass panels 104, 106, and 108.

Although the invention has been described by reference to specific apparatus, it should be understood that, in its broader aspects, the invention is not necessarily limited to the particular embodiment selected for illustration.

I claim:

1. In apparatus of the character described, in combination, means for successively dropping balls from the same point, means for bouncing the balls in a definite path, mechanism for insuring the lapse of an interval between the release of one ball and the next following, and mechanism for returning the balls to the dropping means for subsequent bouncing; substantially as described.

2. In apparatus of the character described, means for successively dropping balls, a plate in the path of the balls to bounce them in one direction, a second plate to bounce the balls in another direction, and a member arranged to bar the passage of such balls as do not bounce from the second plate in the same path; substantially as described.

3. In apparatus of the character described, means for successively dropping balls, a plate in the path of the balls to bounce them in one direction, a second plate to bounce the balls as received from the first plate, and means for returning the balls that bounce in similar paths from the second plate to the dropping means for subsequent bouncing; substantially as described.

4. In apparatus of the character described, means for successively dropping balls, a plate in the path of the balls to bounce them in one direction, a second plate for bouncing the balls as received from the first plate, and a ring or hoop having an opening in a definite location between said first and second plates to permit the passage of balls of like character from the first plate to the second; substantially as described.

5. In apparatus of the character described, a substantially upright tube, concealed means for elevating a stream of balls through the tube, a delivery chute extending from the tube, a plate to bounce the balls dropped from the chute, and an opaque member having an opening in the path of the bouncing balls to admit balls of uniform characteristics, said member concealing the subsequent course of said balls and separating the remaining balls therefrom; substantially as described.

6. In apparatus of the character described, a substantially upright tube, means for elevating a stream of balls through the tube, a delivery chute projecting from the tube, a plate to bounce the balls dropped from the chute, a second plate for bouncing the balls as received from the first plate, a member having an opening in the path of the balls, and concealed means for returning the balls to the elevating means; substantially as described.

7. In apparatus of the character described, a substantially upright tube, means for feeding a stream of balls through the tube, a delivery chute extending from the tube, a plate below the chute to bounce the balls, a member having an opening in the path of the bouncing balls, a second plate for bouncing the balls, a wall having an opening through which the balls pass from the second plate, and means for returning the balls to the feeding means; substantially as described.

8. In apparatus of the character described, a hollow standard, an inclined plate extending from the standard and having an opening communicating with the standard, a channel in said plate of less width than the diameter of the opening, and means for elevating balls in the standard to the channel; substantially as described.

9. In apparatus of the character described, in combination, means for successively dropping balls for ball bearings, a plate in the path of the balls to bounce them in a definite path, and an assembled ball bearing arranged across the path of the balls for the balls to jump through in the bouncing operation; substantially as described.

10. In apparatus of the character described, an inclined chute for imparting uniform velocity to balls for bouncing, a substantially upright tube for conducting balls to the chute, and means for intermittently moving the balls a uniform distance in the tube to raise the balls one by one even with the chute; substantially as described.

11. In apparatus of the character described, in combination, means for dropping balls one-by-one from a definite point with an interval between, a plate for bouncing the balls in a definite path, a ring having its opening arranged in said path for the balls to enter, and mechanism for returning the balls to the dropping means for subsequent bouncing; substantially as described.

In testimony whereof I hereunto affix my signature.

DUDLEY W. NEARING.